(12) United States Patent
Tsukagoshi

(10) Patent No.: US 10,924,785 B2
(45) Date of Patent: Feb. 16, 2021

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/774,142

(22) PCT Filed: Sep. 13, 2017

(86) PCT No.: PCT/JP2017/033028
§ 371 (c)(1),
(2) Date: May 7, 2018

(87) PCT Pub. No.: WO2018/052021
PCT Pub. Date: Mar. 22, 2018

(65) Prior Publication Data
US 2018/0332322 A1    Nov. 15, 2018

(30) Foreign Application Priority Data

Sep. 14, 2016 (JP) ................. 2016-180019
Oct. 11, 2016 (JP) ................. 2016-200289

(51) Int. Cl.
*H04N 21/236* (2011.01)
*H04N 21/435* (2011.01)
(Continued)

(52) U.S. Cl.
CPC ..... *H04N 21/23614* (2013.01); *H04N 21/236* (2013.01); *H04N 21/434* (2013.01);
(Continued)

(58) Field of Classification Search
CPC ........... H04N 21/23614; H04N 21/236; H04N 21/434; H04N 21/4348; H04N 21/435; H04N 21/4356; H04N 21/4884
(Continued)

(56) References Cited

U.S. PATENT DOCUMENTS

| 2002/0186320 A1* | 12/2002 | Carlsgaard | ......... H04N 21/4622 348/468 |
| 2005/0196147 A1* | 9/2005 | Seo | ...................... G11B 27/105 386/243 |

(Continued)

FOREIGN PATENT DOCUMENTS

| JP | 2011-30180 A | 2/2011 |
| JP | 2016-28472 A | 2/2016 |

OTHER PUBLICATIONS

Extended European Search Report dated Sep. 21, 2018 in corresponding European Patent Application No. 17850922.0 citing documents AW-AZ therein, 8 pages.
(Continued)

*Primary Examiner* — Nnenna N Ekpo
(74) *Attorney, Agent, or Firm* — Oblon, McClelland, Maier & Neustadt, L.L.P.

(57) ABSTRACT

To allow subtitle bitmap data to be favorably superimposed onto video data on the reception side.
A video stream having progressive video data is generated. A subtitle stream having progressive subtitle bitmap data is generated. A container including the video stream and the subtitle stream, in a predetermined format is transmitted. For example, the progressive subtitle bitmap data divided into top-field subtitle bitmap data and bottom-field subtitle bitmap data or not divided is present in the subtitle stream.

13 Claims, 13 Drawing Sheets

(51) Int. Cl.
*H04N 21/434* (2011.01)
*H04N 21/488* (2011.01)

(52) U.S. Cl.
CPC ....... *H04N 21/435* (2013.01); *H04N 21/4348* (2013.01); *H04N 21/4356* (2013.01); *H04N 21/4884* (2013.01)

(58) Field of Classification Search
USPC .......................................................... 725/32
See application file for complete search history.

(56) References Cited

U.S. PATENT DOCUMENTS

| | | | | |
|---|---|---|---|---|
| 2007/0280641 | A1* | 12/2007 | Uchimura | G11B 27/034 386/230 |
| 2008/0130760 | A1* | 6/2008 | Nakamori | H04N 21/23614 375/240.27 |
| 2012/0257104 | A1* | 10/2012 | Oh | H04N 7/0115 348/441 |
| 2014/0078248 | A1* | 3/2014 | Tsukagoshi | H04N 13/161 348/43 |
| 2018/0054660 | A1* | 2/2018 | Hwang | H04N 21/234 |

OTHER PUBLICATIONS

"Digital Video Broadcasting (DVB); Subtitling systems", ETSI EN 300 743 V1.3.1, XP55479729, Nov. 2006, pp. 1-51.

"Commercial Requirements for Bitmap Subtitles Specification Revision", DVB Document CM-AVC0285r5, XP17849797, Feb. 22, 2016, 8 pages.

Paul Szucs et al., "Consideration of Progressive Scan Coding of Bitmap Subtitles in EN 300 743", TM-SUB0151, DVB Organization, XP17852297, Sep. 15, 2018, 2 pages.

"Digital Video Broadcasting (DVB); Subtitling Systems DVB TM-SUB0145r4: Working Draft Dec. 13, 2016", ETSI EN 300 743 V1.6.1, XP17853112, Dec. 13, 2016, pp. 1-71.

International Search Report dated Nov. 21, 2017, in PCT/JP2017/033028 filed Sep. 13, 2017.

ETSI EN 300 743 V1.5.1, "Digital Video Broadcasting (DVB); Subtitling systems", Jan. 2014, 21 pages.

Office Action dated Apr. 23, 2019 in European Patent Application No. 17 850 922.0, citing document AX therein, 5 pages.

"Digital Video Broadcasting (DVB); Specification for the use of Video and Audio Coding in Broadcasting Applications based on the MPEG-2 Transport Stream", ETSI TS 101 154 V2.3.1, XP017851949, Sep. 8, 2016, 280 pages.

"Digital Video Broadcasting (DVB); Subtitling systems", ETSI EN 300 743 v1.3.1 (Nov. 2006), XP055479729 (51 pages).

DVB Organization, "Commercial Requirements for Bitmap Subtitles Specification Revision DVB Document CM-AVC0285r5", DVB Digital Video Broadcasting C/0 EBU—17A Ancienne Route—CH-1218 Grand Geneva—Switzerland Feb. 22, 2016 (Feb. 22, 2016), XP017849797 (6 pages).

Paul Szucs, et al., "Consideration of progressive scan coding of bitmap subtitles in EN 300 743", Sep. 15, 2016, XP017852297 (2 pages).

DVB Organization, "Digital Video Broadcasting (DVB); Subtitling systems DVB TM-SUB0145r4: Working Draft", ETSI EN 300 743 V1.6.1 (2017-xx), Dec. 13, 2016, XP017853112 (71 pages).

"Digital Video Broadcasting (DVB); Specification for the use of Video and Audio Coding in Broadcasting Applications based on the MPEG-2 Transport System", ETSI TS 101 154 V2.3.1 (), Sep. 8, 2016 (Sep. 8, 2016), XP017851949 (280 pages).

* cited by examiner

FIG. 6

| Syntax | Size | Type |
|---|---|---|
| object_data_segment(){ | | |
| sync_byte | 8 | bslbf |
| segment_type | 8 | bslbf |
| page_id | 16 | bslbf |
| segment_length | 16 | uimsbf |
| object_id | 16 | bslbf |
| object_version_number | 4 | uimsbf |
| object_coding_method | 2 | bslbf |
| non_modifying_colour_flag | 1 | bslbf |
| reserved | 1 | bslbf |
| if (object_coding_method == '00' ){ | | |
| top_field_data_block_length | 16 | uimsbf |
| bottom_field_data_block_length | 16 | uimsbf |
| while (processed_length<top_field_data_block_length) | | |
| pixel-data_sub-block() | | |
| while (processed_length<bottom_field_data_block_length) | | |
| pixel-data_sub-block() | | |
| if(!wordaligned()) | | |
| 8_stuff_bits | 8 | bslbf |
| } | | |

| Syntax | Size | Type |
|---|---|---|
| else if (object_coding_method == '11') { | | |
| progressive_frame_data_block_length | 16 | uimsbf |
| while (processed_length<progressive_frame_data_block_length) | | |
| pixel-data_sub-block() | | |
| if(!wordalined()) | | |
| 8_stuff_bits | 8 | bslbf |
| } | | |
| } | | |

(b)

| | |
|---|---|
| object_coding_method | INDICATES OBJECT TO WHICH OBJECT CODING IS TO BE PERFORMED |
| "00" | coding of pixels to non-progressive video |
| "11" | coding of pixels to progressive video |

| Syntax | No. of Bits | Format |
|---|---|---|
| Display_definition_segment() { | | |
| sync_byte | 8 | uimsbf |
| segment_type | 8 | uimsbf |
| : | | |
| segment_length | 8 | uimsbf |
| : | | |
| display_window_flag | 1 | bslbf |
| display_rendering_type | 2 | uimsbf |
| display_width | 16 | uimsbf |
| display_height | 16 | uimsbf |
| if( display_window_flag == 1 ) { | | |
| display_window_horizontal_position_minimum | 16 | uimsbf |
| display_window_horizontal_position_maximum | 16 | uimsbf |
| display_window_vertical_position_minimum | 16 | uimsbf |
| display_window_vertical_position_maximum | 16 | uimsbf |
| } | | |
| } | | |

(b)

display_rendering_type (2bits)

'11'  REPRESENTS THAT DISPLAY POSITION OF CAPTIONS IS TO BE TRANSFORMED IN ACCORDANCE WITH VIDEO COORDINATES OF OBJECT TO WHICH OVERLAY DISPLAY IS TO BE PERFORMED

FIG. 9

| Stream_content | Component_type | Description |
|---|---|---|
| 0x03 | 0x10 | DVB subtitles (normal) with no monitor aspect ratio criticality |
| 0x03 | 0x11 | DVB subtitles (normal) for display on 4:3 aspect ratio monitor |
| 0x03 | 0x12 | DVB subtitles (normal) for display on 16:9 aspect ratio monitor |
| 0x03 | 0x13 | DVB subtitles (normal) for display on 2.21:1 aspect ratio monitor |
| 0x03 | 0x14 | DVB subtitles (normal) for display on a high definition monitor |
| 0x03 | 0x15 | DVB subtitles (normal) for display on a 3D high definition monitor |
| 0x03 | 0x16 | DVB subtitles (normal) for display on a ultra high definition monitor |
| 0x03 | 0x20 | DVB subtitles (for the hard of hearing) with no monitor aspect ratio criticality |
| 0x03 | 0x21 | DVB subtitles (for the hard of hearing) for display on 4:3 aspect ratio monitor |
| 0x03 | 0x22 | DVB subtitles (for the hard of hearing) for display on 16:9 aspect ratio monitor |
| 0x03 | 0x23 | DVB subtitles (for the hard of hearing) for display on 2.21:1 aspect ratio monitor |
| 0x03 | 0x24 | DVB subtitles (for the hard of hearing) for display on a high definition monitor |
| 0x03 | 0x25 | DVB subtitles (for the hard of hearing) for display on a 3D high definition monitor |
| 0x03 | 0x26 | DVB subtitles (for the hard of hearing) for display on a ultra high definition monitor |

FIG. 13

Syntax of "Rendering_guide_segment"

(a)

| Syntax | Size | Type |
|---|---|---|
| Rendering_guide_segment(){ | | |
| sync_byte | 8 | bslbf |
| segment_type | 8 | bslbf |
| page_id | 16 | uimsbf |
| segment_length | 16 | uimsbf |
| rgs_version_number | 4 | uimsbf |
| pixel_rendering_conversion_ratio | 2 | bslbf |
| reserved | 2 | bslbf |
| } | | |

(b)

pixel_rendering_conversion_ratio(2)
    INDICATES TRANSFORM MAGNIFICATION FOR CAUSING SUBTITLE PASTE POSITION (WINDOW REGION) FOR DISPLAYING SUBTITLES, DESCRIBED IN DDS, TO CORRESPOND TO PIXEL COORDINATES OF VIDEO RESOLUTION OF OBJECT TO WHICH SUPERIMPOSITION IS TO BE PERFORMED.
    (RESOLUTION OF SUBTITLES IS INDICATED WITH FACTORS OF display_height AND display_width IN DDS.
    IN ADDITION, ORIGIN FOR MAGNIFICATION CALCULATION IS SET TO top-left POSITION OF SUBTITLE PASTE POSITION.)

'00'    UNITY MAGNIFICATION (SUPERIMPOSE CAPTIONS KEEPING ORIGINAL POSITION, ONTO VIDEO)
    '01'    DOUBLE (DOUBLE ENLARGE SUBTITLE PASTE POSITION HORIZONTALLY AND VERTICALLY, AND SUPERIMPOSE SUBTITLE PASTE POSITION ONTO VIDEO)
    '10'    QUADRUPLE (QUADRUPLY ENLARGE SUBTITLE PASTE POSITION HORIZONTALLY AND VERTICALLY, AND SUPERIMPOSE SUBTITLE PASTE POSITION ONTO VIDEO)

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and more particularly relates to, for example, a transmission device that transmits subtitle bitmap data together with video data.

BACKGROUND ART

Conventionally, for example, management of transmitting subtitle data in bitmap data has been performed in broadcasting, such as digital video broadcasting (DVB) (e.g., refer to Patent Document 1).

CITATION LIST

Patent Document

Patent Document 1: Japanese Patent Application Laid-Open No. 2011-030180

SUMMARY OF THE INVENTION

Problems to be Solved by the Invention

An object of the present technology is to allow subtitle bitmap data to be favorably superimposed onto video data on the reception side.

Solutions to Problems

According to a concept of the present technology, a transmission device includes: a video encoding unit configured to generate a video stream having progressive video data; a subtitle encoding unit configured to generate a subtitle stream having progressive subtitle bitmap data; and a transmission unit configured to transmit a container including the video stream and the subtitle stream, in a predetermined format.

According to the present technology, the video encoding unit generates the video stream having the progressive video data. The subtitle encoding unit generates the subtitle stream having the progressive subtitle bitmap data. Then, the transmission unit transmits the container including the video stream and the subtitle stream, in the predetermined format.

For example, the progressive subtitle bitmap data divided into a top-field subtitle bitmap data and a bottom-field subtitle bitmap data, may be present in the subtitle stream. In this case, for example, a top-field data block and a bottom-field data block may be present in the subtitle stream, and the top-field subtitle bitmap data may be arranged in the top-field data block and the bottom-field subtitle bitmap data may be arranged in the bottom-field data block.

In addition, for example, the progressive subtitle bitmap data not divided may be present in the subtitle stream. In this case, for example, a top-field data block and a bottom-field data block may be present in the subtitle stream, and the progressive subtitle bitmap data not divided may be arranged in the top-field data block or the bottom-field data block. In addition, in this case, for example, a progressive data block may be present in the subtitle stream, and the progressive subtitle bitmap data not divided may be arranged in the progressive data block.

In this manner, according to the present technology, the progressive subtitle bitmap data is transmitted along the transmission of the progressive video data. Therefore, the subtitle bitmap data is favorably superimposed onto the video data on the reception side.

Note that, according to the present technology, for example, there may be further provided an identification-information insertion unit configured to insert, into a layer of the subtitle stream, identification information indicating that, after performance of coordinate transform and resolution transform to the subtitle bitmap data having second resolution, the subtitle bitmap data is to be superimposed onto the video data having first resolution higher than the second resolution. In this case, on the reception side, the subtitle bitmap data is favorably superimposed onto the video data with the superimposition of the subtitle bitmap data onto the video data after the performance of the coordinate transform and the resolution transform to the subtitle bitmap data, on the basis of the identification information.

In addition, according to a different concept of the present technology, a reception device includes: a reception unit configured to receive a container including a video stream having progressive video data and a subtitle stream having progressive subtitle bitmap data, in a predetermined format; and a control unit configured to control processing of acquiring the progressive video data with decoding of the video stream, processing of acquiring the progressive subtitle bitmap data with decoding of the subtitle stream, and processing of acquiring display video data with superimposition of the progressive subtitle bitmap data onto the progressive video data.

According to the present technology, the reception unit receives the container including the video stream having the progressive video data and the subtitle stream having the progressive subtitle bitmap data, in the predetermined format. Then, the control unit controls the processing of acquiring the progressive video data with the decoding of the video stream, the processing of acquiring the progressive subtitle bitmap data with the decoding of the subtitle stream, and the processing of acquiring the display video data with the superimposition of the progressive subtitle bitmap data onto the progressive video data.

For example, the progressive subtitle bitmap data divided into a top-field subtitle bitmap data and bottom-field subtitle bitmap data may be present in the subtitle stream, and the progressive subtitle bitmap data may be acquired with composition of the top-field subtitle bitmap data and the bottom-field subtitle bitmap data acquired by the decoding of the subtitle stream, in the processing of acquiring the progressive subtitle bitmap data.

In addition, for example, a top-field data block and a bottom-field data block may be present in the subtitle stream, and the progressive subtitle bitmap data not divided, inserted in the top-field data block or the bottom-field data block, may be acquired in the processing of acquiring the progressive subtitle bitmap data.

In addition, for example, a progressive data block may be present in the subtitle stream, and the progressive subtitle bitmap data not divided, inserted in the progressive data block may be acquired in the processing of acquiring the progressive subtitle bitmap data.

In this manner, according to the present technology, the display video data is acquired with the superimposition of the progressive subtitle bitmap data acquired by the decoding of the subtitle stream, onto the progressive video data. Therefore, the subtitle bitmap data is favorably superimposed onto the video data.

In addition, according to a different concept of the present technology, a transmission device includes: a video encoding unit configured to generate a video stream having video data with first resolution; a subtitle encoding unit configured to generate a subtitle stream having subtitle bitmap data with second resolution lower than the first resolution; a transmission unit configured to transmit a container including the video stream and the subtitle stream, in a predetermined format; and an identification-information insertion unit configured to insert, into a layer of the subtitle stream, identification information indicating that, after performance of coordinate transform and resolution transform to the subtitle bitmap data, the subtitle bitmap data is to be superimposed onto the video data.

According to the present technology, the video encoding unit generates the video stream having the video data with the first resolution. The subtitle encoding unit generates the subtitle stream having the subtitle bitmap data with the second resolution lower than the first resolution. Then, the transmission unit transmits the container including the video stream and the subtitle stream, in the predetermined format. For example, the first resolution may be UHD resolution and the second resolution may be HD resolution.

The identification-information insertion unit inserts, into the layer of the subtitle stream, the identification information indicating that, after the performance of the coordinate transform and the resolution transform to the subtitle bitmap data, the subtitle bitmap data is to be superimposed onto the video data. For example, there may be further provided a resolution-information insertion unit configured to insert, into a layer of the container, information regarding the first resolution included in the video data onto which the subtitle bitmap data to be superimposed. In addition, for example, the identification-information insertion unit may insert the identification information into a display definition segment. In addition, for example, the identification-information insertion unit may insert a segment as the identification information, into the subtitle stream. In this case, for example, the segment as the identification information, may include information regarding transform magnification.

In this manner, according to the present technology, the identification information is inserted in the layer of the subtitle stream, the identification information indicating that, after the performance of the coordinate transform and the resolution transform to the subtitle bitmap data, the subtitle bitmap data is to be superimposed onto the video data. Therefore, on the reception side, the subtitle bitmap data is superimposed onto the video data after the performance of the coordinate transform and the resolution transform to the subtitle bitmap data, on the basis of the identification information, so that the subtitle bitmap data is favorably superimposed onto the video data.

In addition, according to a different concept of the present technology, a reception device includes: a reception unit configured to receive a container including a video stream having video data with first resolution and a subtitle stream having subtitle bitmap data with second resolution lower than the first resolution, in a predetermined format, identification information being inserted in a layer of the subtitle stream, the identification information indicating that, after performance of coordinate transform and resolution transform to the subtitle bitmap data, the subtitle bitmap data is to be superimposed onto the video data; and a control unit configured to control processing of acquiring the video data with decoding of the video stream, processing of acquiring the subtitle bitmap data with decoding of the subtitle stream, and processing of acquiring display video data with the superimposition of the subtitle bitmap data onto the video data after the performance of the coordinate transform and the resolution transform to the subtitle bitmap data, on the basis of the identification information.

According to the present technology, the reception unit receives the container including the video stream having the video data with the first resolution and the subtitle stream having the subtitle bitmap data with the second resolution lower than the first resolution, in the predetermined format. The identification information is inserted in the layer of the subtitle stream, the identification information indicating that, after the performance of the coordinate transform and the resolution transform to the subtitle bitmap data, the subtitle bitmap data is to be superimposed onto the video data.

The control unit controls the processing of acquiring the video data with the decoding of the video stream, the processing of acquiring the subtitle bitmap data with the decoding of the subtitle stream, and the processing of acquiring the display video data with the superimposition of the subtitle bitmap data onto the video data after the performance of the coordinate transform and the resolution transform to the subtitle bitmap data, on the basis of the identification information.

In this manner, according to the present technology, after the performance of the coordinate transform and the resolution transform to the subtitle bitmap data with the second resolution, the subtitle bitmap data is superimposed onto the video data with the first resolution, to acquire the display video data. Therefore, the subtitle bitmap data is favorably superimposed onto the video data.

Effects of the Invention

According to the present technology, the subtitle bitmap data is allowed to be favorably superimposed onto the video data on the reception side. Note that the effects described in the present specification are, but are not limited to, just exemplifications, and thus additional effects may be provided.

BRIEF DESCRIPTION OF DRAWINGS

FIG. 6 is a table of an exemplary structure of an object data segment.

FIG. 7 illustrates respective tables of the exemplary structure of the object data segment and the description of main information in the exemplary structure.

FIG. 8 illustrates respective tables of an exemplary structure of a display definition segment and the description of main information in the exemplary structure.

FIG. 9 is a table of the correspondence between values of "component_type" being an important factor of a component descriptor and the subtitle bitmap data identified with the respective values.

FIG. 13 illustrates respective tables of an exemplary structure of a rendering guide segment and the description of main information in the exemplary structure.

MODE FOR CARRYING OUT THE INVENTION

A mode for carrying out the invention (hereinafter, referred to as an "embodiment") will be described below.

Note that the descriptions will be given in the following order.
1. Embodiment
2. Modification 1. Embodiment

[Exemplary Configuration of Transmission and Reception System]

Figure 1:
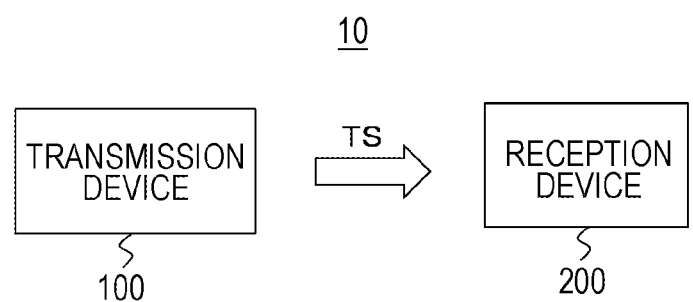
FIG. 1 is a block diagram of an exemplary configuration of a transmission and reception system according to an embodiment.

FIG. 1 illustrates an exemplary configuration of a transmission and reception system 10 according to the embodiment. The transmission and reception system 10 includes a transmission device 100 and a reception device 200.

The transmission device 100 generates a transport stream TS of MPEG2 as a container and disposes the transport stream TS onto a packet of a broadcast wave or a net, to transmit the transport stream TS. The transport stream TS includes a video stream having progressive video data (image data) in UHD resolution. Here, the UHD resolution exceeds HD resolution, and includes 4K resolution or 8K resolution.

In addition, the transport stream TS includes a subtitle stream having progressive subtitle bitmap data (caption data) in the HD resolution. According to the embodiment, the progressive subtitle bitmap data is transported by any of methods 1, 2, 3, and 4.

[Description of Method 1]

The method 1 will be described. For the method 1, the progressive subtitle bitmap data divided into top-field subtitle bitmap data and bottom-field subtitle bitmap data is present in the subtitle stream.

FIG. 2(a) schematically illustrates the transport of the method 1. In this case, a top-field data block and a bottom-field data block are present in an ODS (Object_data_segment) being a coded caption transport format in the subtitle stream. Then, the top-field subtitle bitmap data is arranged in the top-field data block, and the bottom-field subtitle bitmap data is arranged in the bottom-field data block.

In this case, since the subtitle bitmap data is arranged in both of the top-field data block and the bottom-field data block, it is recognized that composition of the pieces of subtitle bitmap data in both of the blocks allows the progressive subtitle bitmap data to form, on the reception side.

On the reception side, the top-field subtitle bitmap data and the bottom-field subtitle bitmap data are extracted from the respective blocks and then are composited, so that the progressive subtitle bitmap data for displaying subtitles (captions) is acquired. The progressive subtitle bitmap data is superimposed onto the progressive video data, so that display video data is acquired.

[Description of Method 2]

The method 2 will be described. For the method 2, the progressive subtitle bitmap data integrated, namely, not divided is present in the subtitle stream.

FIG. 2(b) schematically illustrates the transport of the method 2. In this case, the top-field data block and the bottom-field data block are present in the ODS (Object_data_segment) being the coded caption transport format in the subtitle stream. Then, the progressive subtitle bitmap data not divided is arranged in the top-field data block. In this case, no subtitle bitmap data is arranged in the bottom-field data block.

In this case, since the subtitle bitmap data is arranged only in the top-field data block and no subtitle bitmap data is arranged in the bottom-field data block, it is recognized that only the subtitle bitmap data arranged in the top-field data block allows the progressive subtitle bitmap data to form, on the reception side.

On the reception side, the progressive subtitle bitmap data not divided is extracted from the top-field data block, and then the progressive subtitle bitmap data not divided, remaining intact is allowed to be the progressive subtitle bitmap data for displaying subtitles (captions). The progressive subtitle bitmap data is superimposed onto the progressive video data, so that the display video data is acquired.

[Description of Method 3]

The method 3 will be described. For the method 3, the progressive subtitle bitmap data integrated, namely, not divided is present in the subtitle stream.

FIG. 3(c) schematically illustrates the transport of the method 3. In this case, the top-field data block and the bottom-field data block are present in the ODS (Object_data_segment) being the coded caption transport format in the subtitle stream. Then, the progressive subtitle bitmap data not divided is arranged in the bottom-field data block. In this case, no subtitle bitmap data is arranged in the top-field data block.

In this case, since the subtitle bitmap data is arranged only in the bottom-field data block and no subtitle bitmap data is arranged in the top-field data block, it is recognized that only the subtitle bitmap data arranged in the bottom-field data block allows the progressive subtitle bitmap data to form, on the reception side.

On the reception side, the progressive subtitle bitmap data not divided is extracted from the bottom-field data block, and then the progressive subtitle bitmap data not divided, remaining intact is allowed to be the progressive subtitle bitmap data for displaying subtitles (captions). The progressive subtitle bitmap data is superimposed onto the progressive video data, so that the display video data is acquired.

[Description of Method 4]

The method 4 will be described. For the method 4, the progressive subtitle bitmap data integrated, namely, not divided is present in the subtitle stream.

FIG. 3(d) schematically illustrates the transport of the method 4. In this case, a progressive data block is present in the ODS (Object_data_segment) being the coded caption transport format in the subtitle stream. Then, the progressive subtitle bitmap data not divided is arranged in the progressive data block.

In this case, since the progressive data block is present and the subtitle bitmap data is arranged in the block, it is recognized that only the subtitle bitmap data arranged in the progressive data block allows the progressive subtitle bitmap data to form, on the reception side.

On the reception side, the progressive subtitle bitmap data not divided is extracted from the progressive data block, and then the progressive subtitle bitmap data not divided, remaining intact is allowed to be the progressive subtitle bitmap data for displaying subtitles (captions). The progressive subtitle bitmap data is superimposed onto the progressive video data, so that the display video data is acquired.

Referring back to FIG. 1, identification information is inserted into a layer of the subtitle stream, the identification information indicating that, after performance of coordinate transform and resolution transform to the subtitle bitmap data with the HD resolution, the subtitle bitmap data is to be superimposed onto the video data with the UHD resolution. The performance of the coordinate transform and the resolution transform to the subtitle bitmap data with the HD resolution in this manner, enables the subtitles (captions) to be displayed at an appropriate position on a video screen with the UHD resolution.

The reception device 200 receives the transport stream TS transmitted from the transmission device 100. The reception device 200 decodes the video stream to acquire the progressive video data in the UHD resolution. In addition, the reception device 200 decodes the subtitle stream to acquire the progressive subtitle bitmap data in the HD resolution. In this case, the decoding processing varies depending on a transport method of the progressive subtitle bitmap data.

For the method 1, since the subtitle bitmap data is arranged in both of the top-field data block and the bottom-field data block, the reception device 200 recognizes that the composition of the pieces of subtitle bitmap data in both of the blocks allows the progressive subtitle bitmap data to form.

In this case, the subtitle stream is decoded, so that the top-field subtitle bitmap data is extracted from the top-field data block and additionally the bottom-field subtitle bitmap data is extracted from the bottom-field data block. Then, the top-field subtitle bitmap data and the bottom-field subtitle bitmap data are composited to acquire the progressive subtitle bitmap data.

For the method 2, since the subtitle bitmap data is arranged only in the top-field data block, the reception device 200 recognizes that only the subtitle bitmap data arranged in the top-field data block allows the progressive subtitle bitmap data to form. In this case, the subtitle stream is decoded and then the subtitle bitmap data is extracted from the top-field data block, so that the progressive subtitle bitmap data is acquired.

For the method 3, since the subtitle bitmap data is arranged only in the bottom-field data block, the reception device 200 recognizes that only the subtitle bitmap data arranged in the top-field data block allows the progressive subtitle bitmap data to form. In this case, the subtitle stream is decoded and then the subtitle bitmap data is extracted from the bottom-field data block, so that the progressive subtitle bitmap data is acquired.

For the method 4, the reception device 200 recognizes that only the subtitle bitmap data arranged in the progressive data block allows the progressive subtitle bitmap data to form. In this case, the subtitle stream is decoded and then the subtitle bitmap data is extracted from the progressive data block, so that the progressive subtitle bitmap data is acquired.

As described above, the identification information is inserted in the layer of the subtitle stream, the identification information indicating that, after the performance of the coordinate transform and the resolution transform to the subtitle bitmap data with the HD resolution, the subtitle bitmap data is to be superimposed onto the video data with the UHD resolution. The reception device 200 performs the coordinate transform and the resolution transform to the progressive subtitle bitmap data acquired as described above, on the basis of the identification information, and then superimposes the progressive subtitle bitmap data onto the progressive video data to acquire the display video data.

FIG. 4(a) illustrates use of the subtitle bitmap data remaining intact without the performance of the coordinate transform and the resolution transform. In this case, the subtitles (captions) with the HD resolution are superimposed (overlaid) at an HD display position on the video screen with the UHD resolution, so that the subtitles (captions) are not displayed at an appropriate position due to the difference in coordinate width between UHD and HD. Note that, "R" represents a reference point (origin). In addition, "p0" represents an upper left point being the starting point of the region. "q0" represents a lower right point being the terminal point of the region.

FIG. 4(b) illustrates use of the subtitle bitmap data subjected to the coordinate transform and the resolution transform. In this case, the subtitles (captions) with the UHD resolution are superimposed (overlaid) at an UHD display position on the video screen with the UHD resolution, so that the subtitles (captions) are displayed at an appropriate position.

In this case, due to the coordinate transform, the coordinates of the starting point "p1" of the region is acquired by the following transform: p1(x, y)=p0(x, y)*N, and the coordinates of the terminal point "q1" of the region is acquired by the following transform: q1(x, y)=q0(x, y)*N. Here, "N" represents the ratio between the UHD resolution and the HD resolution. In a case where the UHD resolution is the 4K resolution, the following expression is satisfied: N=2.

In addition, in this case, scaling processing is horizontally and vertically performed to the subtitle bitmap data with the value of the "N", so that the subtitle bitmap data with the HD resolution is transformed into the subtitle bitmap data with the UHD resolution.

[Exemplary Configuration of Transmission Device]

Figure 5:
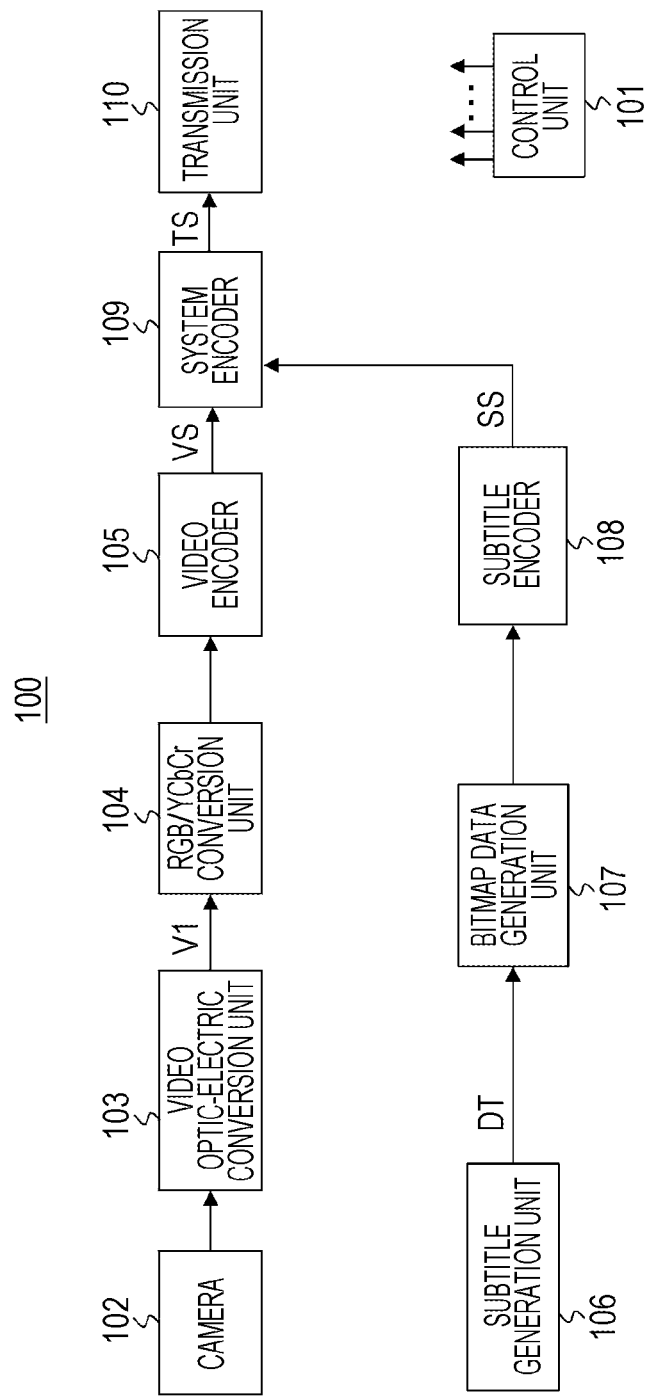
FIG. 5 is a block diagram of an exemplary configuration of a transmission device.

FIG. 5 illustrates an exemplary configuration of the transmission device 100. The transmission device 100 includes a control unit 101, a camera 102, a video optic-electric conversion unit 103, an RGB/YCbCr conversion unit 104, a video encoder 105, a subtitle generation unit 106, a bitmap data generation unit 107, a subtitle encoder 108, a system encoder 109, and a transmission unit 110.

The control unit 101 includes a central processing unit (CPU), and controls the operation of each unit of the transmission device 100 on the basis of control programs. The camera 102 captures a subject to output the progressive video data (image data) in the UHD resolution. The video optic-electric conversion unit 103 performs optic-electric conversion to the video data acquired by the camera 102, to acquire video data V1.

The RGB/YCbCr conversion unit 104 converts the video data V1 from an RGB domain into an YCbCr (luminance/chrominance) domain. The video encoder 105 performs coding, such as MPEG4-AVC or HEVC, to the video data V1 converted into the YCbCr domain, for example, to generate the video stream (PES stream) VS including coded video data.

The subtitle generation unit 106 generates text data (character code) DT as subtitle information. The bitmap data generation unit 107 receives the text data DT generated by the subtitle generation unit 106, to generate the progressive subtitle bitmap data in the HD resolution. The subtitle encoder 108 converts the subtitle bitmap data and display control information into various segments, to generate the subtitle stream SS including a PES packet including the segments arranged in a payload.

The progressive subtitle bitmap data is transported with the object data segment (Object_data_segment) by any of the methods 1 to 4. FIG. 6 and FIG. 7(a) illustrate an exemplary structure (Syntax) of the object data segment. FIG. 7(b) illustrates the description (Semantics) of main information in the exemplary structure.

The 2-bit field of "object_coding_method" indicates whether bitmap data or text data is present on the basis of the type of an object. "00" represents the bitmap data, and "01" represents the text data. In addition, according to the embodiment, "11" is newly defined for progressive video as another representation of the bitmap data, in addition to "00" for interlace video.

When "object_coding_method" is "00", the 16-bit field of "top_field_data_block_length" is present. Then, the block of "pixel-data_sub-block( )", namely, the top-field data block is repeatedly present by the number indicated with "top_field_data_block_length".

In addition, when "object_coding_method" is "00", the 16-bit field of "bottom_field_data_block_length" is present. Then, the block of "pixel-data_sub-block( )", namely, the bottom-field data block is repeatedly present by the number indicated with "bottom_field_data_block_length".

The 8-bit field of "8_stuff_bits" is a field for adding stuffing bits to achieve 8 bits in a case where 8-bit byte alignment is not made.

For the transport of any of the methods 1 to 3, "object_coding_method" is set to "00" and the progressive subtitle bitmap data is arranged in the top-field data block and/or the bottom-field data block.

That is, for the transport of the method 1, the progressive subtitle bitmap data is divided into the top-field subtitle bitmap data and the bottom-field subtitle bitmap data, and then the top-field subtitle bitmap data is arranged in the top-field data block and the bottom-field subtitle bitmap data is arranged in the bottom-field data block.

In addition, for the transport of the method 2, the progressive subtitle bitmap data is not divided and the entire non-divided progressive subtitle bitmap data is arranged in the top-field data block. In this case, "bottom_field_data_block_length" is set to 0, and thus it is indicated that no subtitle bitmap data is arranged in the bottom-field data block.

In addition, for the transport of the method 3, the progressive subtitle bitmap data is not divided, and the entire non-divided progressive subtitle bitmap data is arranged in the bottom-field data block. In this case, "top_field_data_block_length" is set to 0, and thus it is indicated that no subtitle bitmap data is arranged in the top-field data block.

In addition, when "object_coding_method" is "11", the 16-bit field of "progressive_frame_data_block_length" is present. Then, the block of "pixel-data_sub-block( )", namely, the progressive data block is repeatedly present by the number indicated with "progressive_frame_data_block_length". The 8-bit field of "8_stuff_bits" is a field for adding stuffing bits to achieve 8 bits in a case where 8-bit byte alignment is not made.

For the transport of the method 4, "object_coding_method" is set to 11 and the progressive subtitle bitmap data is arranged in the progressive data block. That is, the progressive subtitle bitmap data is not divided, and the entire non-divided progressive subtitle bitmap data is arranged in the progressive data block.

A display definition segment "display_definition_segment" includes the identification information indicating that, after the performance of the coordinate transform and the resolution transform to the subtitle bitmap data with the HD resolution, the subtitle bitmap data is to be superimposed onto the video data with the UHD resolution.

FIG. 8(a) illustrates an exemplary structure (Syntax) of the display definition segment. FIG. 8(b) illustrates the description (Semantics) of main information in the exemplary structure. The 1-bit field of "display_window_flag" indicates whether the definition of a window is present. "1" represents that the definition of the window is present. "0" represents that no definition of the window is present.

When the 2-bit field of "display_rendering_type" is "11", it is indicated that the display position of the subtitles (captions) is to be transformed in accordance with the video coordinates of an object to which an overlay display is to be performed. That is, the "11" of "display_rendering_type" is the identification information indicating that, after the performance of the coordinate transform and the resolution transform to the subtitle bitmap data with the HD resolution, the subtitle bitmap data is to be superimposed onto the video data with the UHD resolution.

The 16-bit field of "display_width" and the 16-bit field of "display_height" indicate the resolution of the subtitle bitmap data. For example, "display_width" indicates 1920 for the HD resolution, and indicates 3820 for the 4K resolution included in the UHD resolution. In addition, for example, "display_height" indicates 1080 for the HD resolution, and indicates 2160 for the 4K resolution included in the UHD resolution.

When "display_window_flag" is "1", a field indicating the region of the window is present. That is, the 16-bit field of "display_window_horizontal_position_minimum", the 16-bit field of "display_window_horizontal_position_maximum", the 16-bit field of "display_window_vertical_position_minimum", and the 16-bit field of "display_window_vertical_position_maximum" are present.

The fields of "display_window_horizontal_position_minimum" and "display_window_vertical_position_minimum" indicate the coordinates of the starting point of the window. The fields of "display_window_horizontal_position_maximum" and "display_window_vertical_position_maximum" indicate the coordinates of the terminal point of the window.

Referring back to FIG. 5, the system encoder 109 generates the transport stream TS including the video stream VS generated by the video encoder 105 and the subtitle stream SS generated by the subtitle encoder 108. The transmission unit 110 disposes the transport stream TS onto the packet of the broadcast wave or the net, to transmit the transport stream TS to the reception device 200.

At this time, the system encoder 109 inserts resolution information regarding the video data on which the subtitle bitmap data is to be superimposed, into a layer of the transport stream TS as a container. Specifically, the system encoder 109 inserts the resolution information into a component descriptor "Component_descriptor" in an event information table (EIT).

"stream_content" and "component_type" are present as important factors of the component descriptor. FIG. 9 illustrates the correspondence between values of "component_type" and the subtitle bitmap data identified with the respective values. Note that, when "stream_content" is "0x03", it is indicated that the subtitles are for DVB.

Then, for example, when "component_type" is "0x16", it is indicated that the DVB subtitles are for ultra high definition (UHD) monitors. In addition, for example, when "component_type" is "0x26", it is indicated that the DVB subtitles (for the hard of hearing) are for ultra high definition (UHD) monitors. According to the embodiment, "component_type" is "0x16" or "0x26", and thus it is indicated that the DVB subtitles are for UHD-resolution monitors. This indicates that the resolution of the video data on which the subtitle bitmap data is to be superimposed is the UHD resolution.

[Exemplary Configuration of Transport Stream TS]

Figure 10:
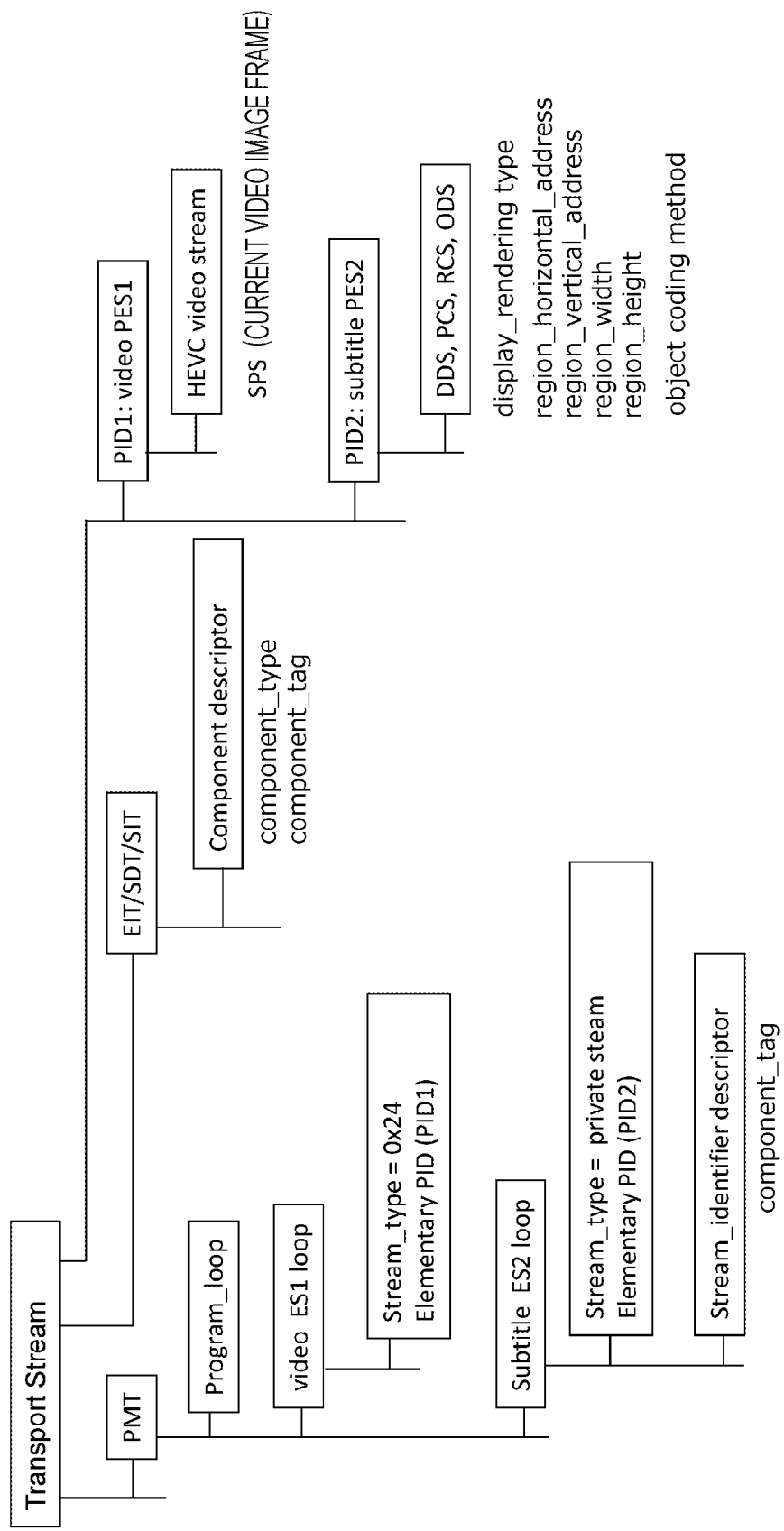
FIG. 10 is a diagram of an exemplary configuration of a transport stream TS.

FIG. 10 illustrates an exemplary configuration of the transport stream TS. A PES packet "Video PES1" of the video stream identified with a PID1 is present in the exemplary configuration. In addition, the PES packet "Subtitle PES2" of the subtitle stream identified with a PID2 is present in the exemplary configuration.

A video coded stream is inserted in the PES packet of the video stream. In addition, the various segments including the subtitle bitmap data and the display control information, are inserted in the PES packet of the subtitle stream.

The field of "object_coding_method" is present in the object data segment (ODS) including the subtitle bitmap data, and an object to which object coding is to be performed is indicated. In addition, the field of "display_rendering_type" is present and has "11" in the display definition segment (DDS), and thus has the identification information indicating that, after the performance of the coordinate transform and the resolution transform to the subtitle bitmap data with the HD resolution, the subtitle bitmap data is to be superimposed onto the video data with the UHD resolution.

In addition, the fields of "region_horizontal_address" and "region_vertical_address" are present in a page composition segment (PCS), and the coordinates of the starting point of the region are indicated. In addition, the fields of "region_width" and "resion_height" are present in a region composition segment (RCS), and the horizontal and vertical sizes of the region are indicated.

In addition, the transport stream TS includes a program map table (PMT) as program specific information (PSI). The PSI is information describing to which program each elementary stream included in the transport stream belongs. A program loop (Program loop) describing information relating to the entire programs is present in the PMT.

In addition, elementary stream loops each having information relating to the elementary stream, are present in the PMT. A video elementary stream loop (video ES1 loop) corresponding to the video stream and a subtitle elementary stream loop (Subtitle ES2 loop) corresponding to the subtitle stream, are present in the exemplary configuration.

In the video elementary stream loop (video ES1 loop), information such as stream type and packet identifier (PID), corresponding to the video stream, is arranged and additionally a descriptor describing information relating to the video stream is arranged. The value of "Stream_type" of the video stream is, for example, set to a value of "0x24" indicating an HEVC video stream, and the PID information indicates the PID1 given to the PES packet "video PES1" of the video stream.

In the subtitle elementary stream loop (Subtitle ES2 loop), information such as stream type and packet identifier (PID), corresponding to the subtitle stream, is arranged and additionally a descriptor describing information relating to the subtitle stream is arranged. The value of "Stream_type" of the subtitle stream is, for example, set to a value indicating a private stream, and the PID information indicates the PID2 given to the PES packet "Subtitle PES2" of the subtitle stream.

In addition, the transport stream TS includes the event information table (EIT) as serviced information (SI) for performing management per event. Metadata per program is described in the EIT. The component descriptor (Component_descriptor) having the factor of "component_type" as the resolution information regarding the video data (refer to FIG. 9) is inserted under the EIT. According to the embodiment, "component_type" is "0x16" or "0x26", and it is indicated that the DVB subtitles are for UHD-resolution resolution monitors. Thus, it is indicated that the resolution of the video data on which the subtitle bitmap data is to be superimposed is the UHD resolution.

Note that, a stream identifier descriptor (Stream_identifier_descriptor) is inserted into the subtitle elementary stream loop (Subtitle ES2 loop). The descriptor associates the subtitle elementary stream loop with the component descriptor under the EIT, with a component tag "Component_tag".

The operation of the transmission device 100 illustrated in FIG. 5, will be simply described. The progressive video data (image data) in the UHD resolution captured and acquired by the camera 102 is supplied to the video optic-electric conversion unit 103. The video optic-electric conversion unit 103 performs the optic-electric conversion to the video data, to acquire the video data V1.

The RGB/YCbCr conversion unit 104 converts the video data V1 acquired by the video optic-electric conversion unit 103, from the RGB domain into the YCbCr (luminance/chrominance) domain, and then supplies the video data V1 to the video encoder 105. The video encoder 105 performs the encoding processing, such as MPEG4-AVC or HEVC, to the video data V1, for example, to generate the video stream (PES stream) VS including the coded video data.

The subtitle generation unit 106 generates the text data (character code) DT as the subtitle information. The text data DT is supplied to the bitmap data generation unit 107. The bitmap data generation unit 107 generates the progressive subtitle bitmap data in the HD resolution, on the basis of the text data DT.

The subtitle bitmap data is supplied to the subtitle encoder 108. The subtitle encoder 108 converts the subtitle bitmap data and the display control information into the various segments, to generate the subtitle stream SS including the PES packet including the segments arranged in the payload.

The progressive subtitle bitmap data is transported with the object data segment (ODS) (refer to FIGS. 6 and 7) by any of the methods 1 to 4. In addition, the identification information is inserted into the display definition segment (DDS) (refer to FIG. 8), the identification information indicating that, after the performance of the coordinate transform and the resolution transform to the subtitle bitmap data with the HD resolution, the subtitle bitmap data is to be superimposed onto the video data with the UHD resolution ("display_rendering_type"="11").

The video stream VS generated by the video encoder 105 is supplied to the system encoder 109. The subtitle stream SS generated by the subtitle encoder 108 is supplied to the system encoder 109. The system encoder 109 generates the transport stream TS including the video stream VS and the subtitle stream SS.

At this time, the system encoder 109 inserts the component descriptor having the resolution information regarding the video data on which the subtitle bitmap data is to be superimposed (factor of "component_type"), into the event information table.

The transmission unit 110 disposes the transport stream TS generated by the system encoder 109, onto the packet of the broadcast wave or the net, to transmit the transport stream TS to the reception device 200.

[Exemplary Configuration of Reception Device]

Figure 11:
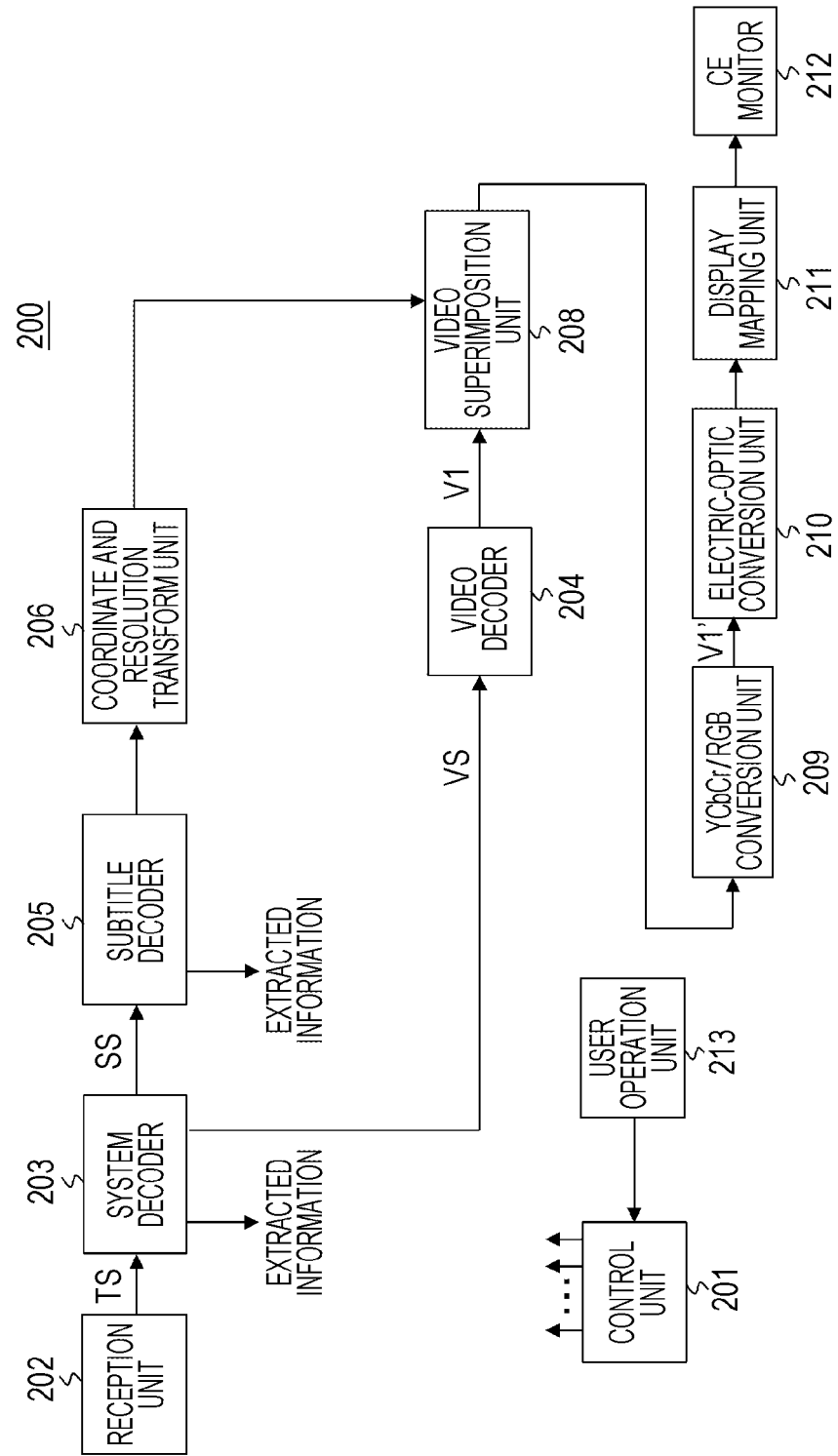
FIG. 11 is a block diagram of an exemplary configuration of a reception device.

FIG. 11 illustrates an exemplary configuration of the reception device 200. The reception device 200 includes a control unit 201, a reception unit 202, a system decoder 203, a video decoder 204, a subtitle decoder 205, and a coordinate and resolution transform unit 206. In addition, the reception device 200 includes a video superimposition unit 208, an YCbCr/RGB conversion unit 209, an electric-optic conversion unit 210, a display mapping unit 211, a CE monitor 212, and a user operation unit 213.

The control unit 201 includes a central processing unit (CPU), and controls the operation of each unit of the reception device 200 on the basis of control programs. The user operation unit 213 includes, for example, switches, a touch panel, and a remote controller transmission unit, for allowing a user, such as a viewer, to perform various operations.

The reception unit 202 receives the transport stream TS transmitted from the transmission device 100, the transport stream TS being disposed on the packet of the broadcast wave or the net. The system decoder 203 extracts the video stream VS and the subtitle stream SS from the transport stream TS.

In addition, the system decoder 203 extracts various types of information inserted in the transport stream TS (container), to send the various types of information to the control unit 201. The extracted information includes the component descriptor having the resolution information regarding the video data on which the subtitle bitmap data is to be superimposed. This arrangement allows the control unit 201 to recognize the resolution of the video data. Note that, the resolution of the video data can be also recognized from information extracted by the video decoder 204.

The video decoder 204 performs decoding processing to the video stream VS extracted by the system decoder 203, to output the progressive transported video data V1 in the UHD resolution. As described above, the UHD resolution exceeds the HD resolution, and includes the 4K resolution or the 8K resolution.

In addition, the video decoder 204 extracts various types of information, such as a parameter set and an SEI message, inserted in each access unit included in the video stream VS, to send the various types of information to the control unit 201.

The subtitle decoder 205 performs decoding processing to the subtitle stream SS, to acquire the progressive subtitle bitmap data in the HD resolution. In this case, the decoding processing varies on the basis of which of the methods 1 to 4 is adopted for the transport method of the progressive subtitle bitmap data.

For example, for the method 1, the top-field subtitle bitmap data is extracted from the top-field data block and additionally the bottom-field subtitle bitmap data is extracted from the bottom-field data block. Then, the top-field subtitle bitmap data and the bottom-field subtitle bitmap data are composited to acquire the progressive subtitle bitmap data.

For the method 2, the subtitle bitmap data is extracted from the top-field data block, so that the progressive subtitle bitmap data is acquired. For the method 3, the subtitle bitmap data is extracted from the bottom-field data block, so that the progressive subtitle bitmap data is acquired. For the method 4, the subtitle bitmap data is extracted from the progressive data block, so that the progressive subtitle bitmap data is acquired.

In addition, the subtitle decoder 205 extracts various types of information inserted in the subtitle stream SS, to send the various types of information to the control unit 201. The extracted information includes the identification information indicating that, after the performance of the coordinate transform and the resolution transform to the subtitle bitmap data with the HD resolution, the subtitle bitmap data is to be superimposed onto the video data with the UHD resolution ("display_rendering_type"="11"). In addition, the extracted information includes information such as the coordinates of the starting point of the region and the horizontal and vertical sizes of the region.

The coordinate and resolution transform unit 206 performs coordinate transform and resolution transform processing, to the progressive subtitle bitmap data acquired by the subtitle decoder 205, under the control of the control unit 201 based on the identification information (identification information indicating that, after the performance of the coordinate transform and the resolution transform to the subtitle bitmap data with the HD resolution, the subtitle bitmap data is to be superimposed onto the video data with the UHD resolution).

Figure 4:
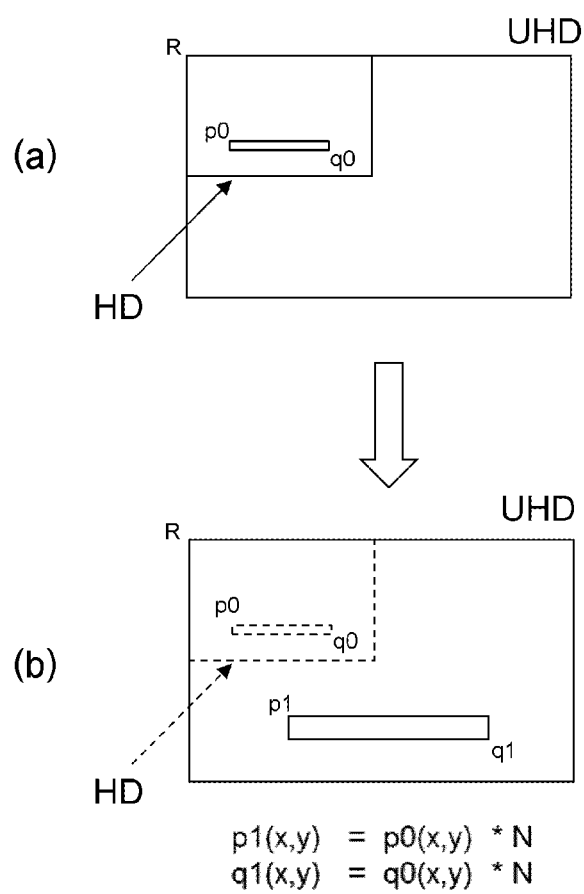
FIG. 4 is a diagram for describing coordinate transform and resolution transform to be performed to the subtitle bitmap data with HD resolution to be superimposed onto video data with UHD resolution.

In this case, as illustrated in FIG. 4(*b*), the coordinates of the starting point "p1" of the region is acquired by the following transform: p1(x, y)=p0(x, y)*N, and the coordinates of the terminal point "q1" of the region is acquired by the following transform: q1(x, y)=q0(x, y)*N. Here, "N" represents the ratio between the UHD resolution and the HD resolution. When the UHD resolution is the 4K resolution, the following expression is satisfied: N=2.

In addition, in this case, the scaling processing is horizontally and vertically performed to the subtitle bitmap data with the value of the "N", so that the subtitle bitmap data with the HD resolution is transformed into the subtitle bitmap data with the UHD resolution.

Figure 12:
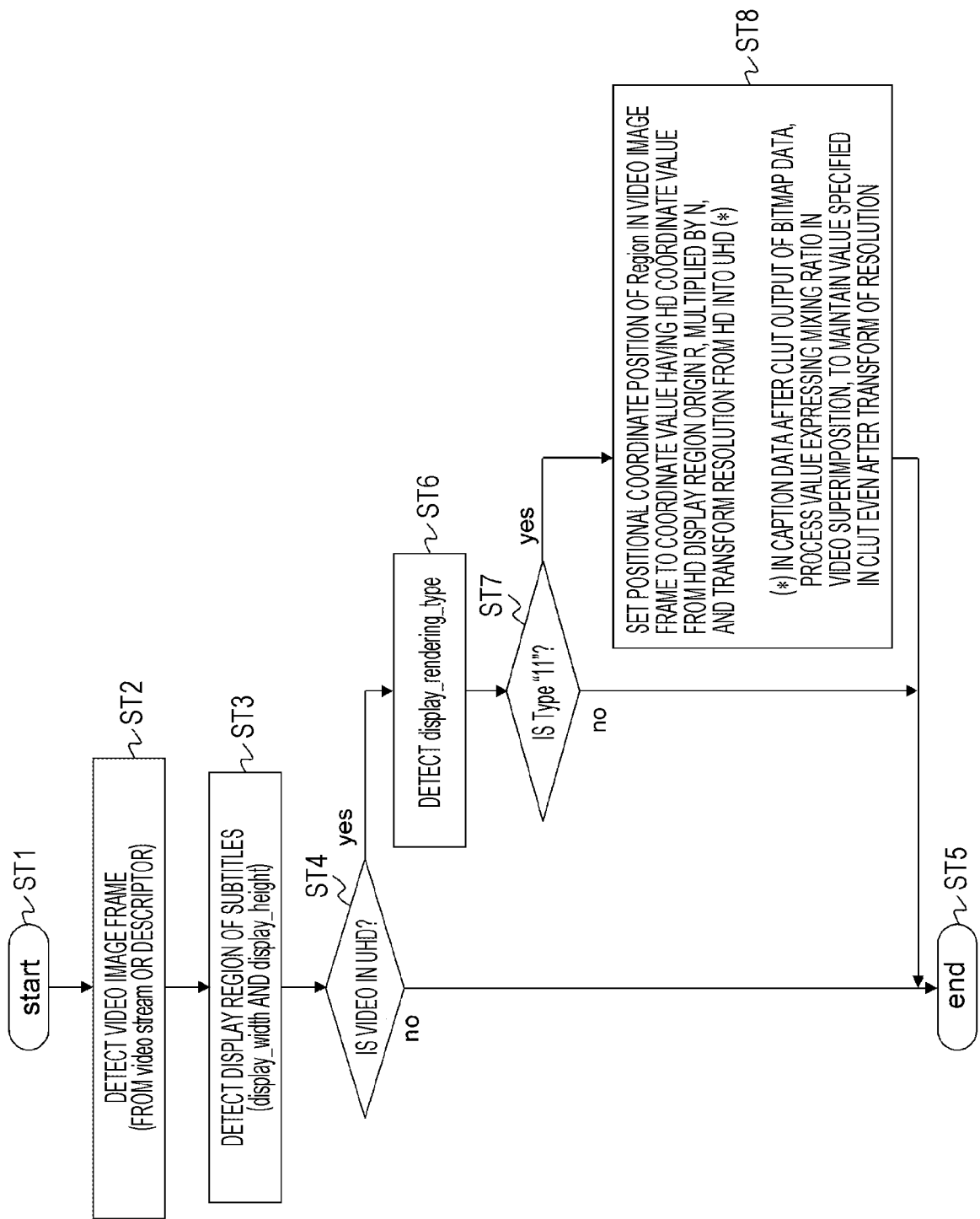
FIG. 12 is a flowchart of exemplary processing in a coordinate and resolution transform unit.

A flowchart of FIG. 12 illustrates exemplary processing in the coordinate and resolution transform unit 206. Not that, here, related processing in the control unit 201 will be also described as the processing of the coordinate and resolution transform unit 206.

The coordinate and resolution transform unit 206 starts the processing at step ST1. Next, the coordinate and resolution transform unit 206 detects a video image frame, namely, the resolution of the video data, at step ST2. The resolution information regarding the video data can be detected from the parameter set (SPS) of the video stream. Alternatively, the resolution information regarding the video data can be detected from the factor of "component_type" in the component descriptor. According to the embodiment, the UHD resolution is detected.

Next, the coordinate and resolution transform unit 206 detects the resolution of the subtitle bitmap data, namely, the display region of the subtitles, at step ST3. The display region of the subtitles (display_width, display_height) can be detected from the display definition segment (DDS). According to the embodiment, the HD resolution is detected.

Next, the coordinate and resolution transform unit 206 determines whether the resolution of the video data is the UHD resolution, at step ST4. When determining that the resolution of the video data is not the UHD resolution, the coordinate and resolution transform unit 206 finishes the processing, at step ST5.

When determining that the resolution of the video data is the UHD resolution, the coordinate and resolution transform unit 206 detects "display_rendering_type", at step ST6. Then, the coordinate and resolution transform unit 206 determines whether "display_rendering_type" is "11", at step ST7. When determining that "display_rendering_type" is not "11", the coordinate and resolution transform unit 206 finishes the processing, at step ST5.

When determining that "display_rendering_type" is "11", the coordinate and resolution transform unit 206 sets the positional coordinate value of the region in the video image frame, to a coordinate value having the HD coordinate value from the HD display region original R, multiplied by N, at step ST8 (refer to FIG. 4(b)). In addition, the resolution is transformed from HD to UHD along with the transform of the positional coordinate value of the region. Note that, in the caption data after CLUT output of the bitmap data, the value expressing mixing ratio in video superimposition is processed to maintain a value specified in CLUT even after the transform of the resolution.

After the processing at step ST8, the coordinate and resolution transform unit 206 finishes the processing, at step ST5.

Referring back to FIG. 11, the video superimposition unit 208 superimposes the progressive subtitle bitmap data in the UHD resolution acquired through the coordinate and resolution transform unit 206, onto the progressive video data V1 in the UHD resolution acquired by the video decoder 204.

The YCbCr/RGB conversion unit 209 converts the progressive video data V1' including the subtitle bitmap data superimposed thereon, in the UHD resolution from the YCbCr (luminance/chrominance) domain to the RGB domain. The electric-optic conversion unit 210 performs electric-optic conversion to the transported video data V1' converted into the RGB domain, with application of an electric-optic conversion characteristic corresponding to an optic-electric conversion characteristic applied to the transported video data V1', so that the display video data for displaying an image is acquired.

The display mapping unit 211 performs display luminance adjustment corresponding to, for example, the maximum luminance display performance of the CE monitor 212, to the display video data. The CE monitor 212 displays the image on the basis of the display video data. The CE monitor 212 includes, for example, a liquid crystal display (LCD), an organic electroluminescence (EL) display or the like.

The operation of the reception device 200 illustrated in FIG. 11, will be simply described. The reception unit 202 receives the transport stream TS transmitted from the transmission device 100, the transport stream TS being disposed on the packet of the broadcast wave or the net. The transport stream TS is supplied to the system decoder 203. The system decoder 203 extracts the video stream VS and the subtitle stream SS from the transport stream TS.

In addition, the system decoder 203 extracts the various types of information inserted in the transport stream TS (container), to send the various types of information to the control unit 201. The extracted information includes the component descriptor having the resolution information regarding the video data on which the subtitle bitmap data is to be superimposed.

The video stream VS extracted by the system decoder 203 is supplied to the video decoder 204. The video decoder 204 performs the decoding processing to the video stream VS, to acquire the progressive video data V1 in the UHD resolution. In addition, the video decoder 204 extracts the parameter set and the SEI message inserted into each access unit included in the video stream VS, to send the parameter set and the SEI message to the control unit 201.

The subtitle stream SS extracted by the system decoder 203 is supplied to the subtitle decoder 205. The subtitle decoder 205 performs the decoding processing corresponding to any transport method (of the methods 1 to 4), to the subtitle stream SS, to acquire the progressive subtitle bitmap data in the HD resolution.

In addition, the subtitle decoder 205 extracts the various types of information inserted in the subtitle stream SS, to send the various types of information to the control unit 201. The extracted information includes the identification information indicating that, after the performance of the coordinate transform and the resolution transform to the subtitle bitmap data with the HD resolution, the subtitle bitmap data is to be superimposed onto the video data with the UHD resolution ("display_rendering_type"="11"). In addition, the extracted information includes the information such as the coordinates of the starting point of the region and the horizontal and vertical sizes of the region.

The progressive subtitle bitmap data in the HD resolution acquired by the subtitle decoder 205 is supplied to the coordinate and resolution transform unit 206. The coordinate and resolution transform unit 206 performs the coordinate transform and the resolution transform to the subtitle bitmap data to be appropriately superimposed onto the video data with the UHD resolution. The processing in the coordinate and resolution transform unit 206 is performed under the control of the control unit 201, on the basis of the indication of the identification information ("display_rendering_type"="11").

The progressive video data V1 in the UHD resolution acquired by the video decoder 204 is supplied to the video superimposition unit 208. In addition, the progressive subtitle bitmap data in the UHD resolution, having the display position corrected by the coordinate transform, acquired by the coordinate and resolution transform unit 206, is supplied to the video superimposition unit 208. The video superimposition unit 208 superimposes the subtitle bitmap data onto the video data V1.

The video data V1' including the bitmap data superimposed thereon is supplied to the YCbCr/RGB conversion unit 209. The YCbCr/RGB conversion unit 209 converts the video data V1' from the YCbCr (luminance/chrominance) domain to the RGB domain, to supply the video data V1' to the electric-optic conversion unit 210. The electric-optic conversion unit 210 performs the electric-optic conversion to the video data V1', with the application of the electric-optic conversion characteristic corresponding to the optic-electric conversion characteristic applied to the video data V1', so that the display video data for displaying the image is acquired.

The display video data is supplied to the display mapping unit 211. The display mapping unit 211 performs the display luminance adjustment corresponding to, for example, the maximum luminance display performance of the CE monitor 212, to the display video data. The display video data subjected to the display luminance adjustment in this manner is supplied to the CE monitor 212. The CE monitor 212 displays the image on the basis of the display video data.

As described above, the transmission and reception system 10 illustrated in FIG. 1, transmits the progressive subtitle bitmap data with any transport method of the methods 1 to 4, along with the transmission of the progressive video data. Therefore, the subtitle bitmap data is allowed to be favorably superimposed onto the video data on the reception side.

In addition, the transmission and reception system 10 illustrated in FIG. 1, inserts the identification information indicating that, after the performance of the coordinate transform and the resolution transform to the subtitle bitmap data with the HD resolution, the subtitle bitmap data is to be superimposed onto the video data with the UHD resolution, into the layer of the subtitle stream. Therefore, on the reception side, the subtitle bitmap data is superimposed onto the video data after the performance of the coordinate transform and the resolution transform to the subtitle bitmap data, on the basis of the identification information, so that the superimposition of the subtitle bitmap data onto the video data with the UHD resolution can be performed at an appropriate position.

2. Modification

Note that, according to the embodiment, the example in which the identification information is inserted into the display definition segment (DDS) (refer to FIG. 8), the identification information indicating that, after the performance of the coordinate transform and the resolution transform to the subtitle bitmap data with the HD resolution, the subtitle bitmap data is to be superimposed onto the video data with the UHD resolution ("display_rendering_type"="11"), has been given.

However, transport of a newly defined segment enables an effect similar to that of the identification information, to be achieved. In this case, a conventional receiver ignores the newly defined segment, and thus the conventional receiver can effectively avoid malfunctioning.

FIG. 13(*a*) illustrates an exemplary structure (Syntax) of a rendering guide segment (Rendering_guide_segment) as the newly defined segment, and FIG. 13(*b*) illustrates the description (Semantics) of main information in the exemplary structure.

The 2-bit field of "pixel_rendering_conversion_ratio" indicates transform magnification for causing the window region being the paste position for displaying the subtitles (captions) (image display area), described in the display definition segment (DDS), to correspond to the pixel coordinates of the video resolution of the object to which the superimposition is to be performed. Here, the resolution of the subtitles is indicated with the factors of "display_height" and "display_width" in the DDS. In addition, the origin for magnification calculation is set to the top-left position of the paste position (window region).

"00" represents unity magnification (captions keeping the original position are to be superimposed onto the video). "01" represents double (subtitle paste position is to be double enlarged horizontally and vertically, and then is to be superimposed onto the video). "10" represents quadruple (subtitle paste position is to be quadruply enlarged horizontally and vertically, and then is to be superimposed onto the video). For example, in a case where the resolution of the subtitles has an HD (1920×1080) image frame and the resolution of the video to which the superimposition is to be performed has an UHD (3840×2160) image frame, "pixel_rendering_conversion_ratio" is "01" and thus double magnification is performed.

In addition, according to the embodiment, the example in which first resolution being the resolution of the video data is the UHD resolution and second resolution being the resolution of the subtitle bitmap data is the HD resolution, has been given. However, the present technology is not limited to this. For example, a case where the first resolution is the 8K resolution and the second resolution is the 4K resolution or other cases can be considered.

In addition, according to the embodiment, the example in which the resolution of the video data is the UHD resolution and the resolution of the subtitle bitmap data is the HD resolution, has been given. In a case where the resolution of the subtitle bitmap data in resolution is the UHD resolution, the processing of the coordinate transform and the resolution transform is not required on the reception side. In that case, "display_rendering_type" has a value different from "11".

In addition, according to the embodiment, the example in which the container is the MPEG-2 TS, has been given. However, the present technology is not limited to the MPEG-2 TS as the container, and thus can be similarly applied to other packets, for example, in ISOBMFF, MMT and the like.

In addition, the present technology can have the following configurations.

(1) A transmission device including:

a video encoding unit configured to generate a video stream having progressive video data;

a subtitle encoding unit configured to generate a subtitle stream having progressive subtitle bitmap data; and a transmission unit configured to transmit a container including the video stream and the subtitle stream, in a predetermined format.

(2) The transmission device described in (1) above, in which the progressive subtitle bitmap data divided into top-field subtitle bitmap data and bottom-field subtitle bitmap data is present in the subtitle stream.

(3) The transmission device described in (2) above, in which a top-field data block and a bottom-field data block are present in the subtitle stream, and the top-field subtitle bitmap data is arranged in the top-field data block and the bottom-field subtitle bitmap data is arranged in the bottom-field data block.

(4) The transmission device described in (1) above, in which the progressive subtitle bitmap data not divided is present in the subtitle stream.

(5) The transmission device described in (4) above, in which a top-field data block and a bottom-field data block are present in the subtitle stream, and the progressive subtitle bitmap data not divided is arranged in the top-field data block or the bottom-field data block.

(6) The transmission device described in (4) above, in which a progressive data block is present in the subtitle stream, and the progressive subtitle bitmap data not divided is arranged in the progressive data block.

(7) The transmission device described in any of (1) to (6), further including an identification-information insertion unit configured to insert, into a layer of the subtitle stream, identification information indicating that, after performance of coordinate transform and resolution transform to the subtitle bitmap data having second resolution, the subtitle bitmap data is to be superimposed onto the video data having first resolution higher than the second resolution.

(8) A transmission method including the steps of:

generating a video stream having video data, by a video encoding unit;

generating a subtitle stream having progressive subtitle bitmap data, by the subtitle encoding unit; and transmitting a container including the video stream and the subtitle stream, in a predetermined format, by a transmission unit.

(9) A reception device including:

a reception unit configured to receive a container including a video stream having progressive video data and a subtitle stream having progressive subtitle bitmap data, in a predetermined format; and a control unit configured to control processing of acquiring the progressive video data with decoding of the video stream, processing of acquiring the progressive subtitle bitmap data with decoding of the subtitle stream, and processing of acquiring display video data with superimposition of the progressive subtitle bitmap data onto the progressive video data.

(10) The reception device described in (9) above, in which the progressive subtitle bitmap data divided into top-field subtitle bitmap data and bottom-field subtitle bitmap data is present in the subtitle stream, and the progressive subtitle bitmap data is acquired with composition of the top-field subtitle bitmap data and the bottom-field subtitle bitmap data acquired by the decoding of the subtitle stream, in the processing of acquiring the progressive subtitle bitmap data.

(11) The reception device described in (9) above, in which a top-field data block and a bottom-field data block are present in the subtitle stream, and the progressive subtitle bitmap data not divided, inserted in the top-field data block or the bottom-field data block, is acquired in the processing of acquiring the progressive subtitle bitmap data.

(12) The reception device described in (9) above, in which a progressive data block is present in the subtitle stream, and the progressive subtitle bitmap data not divided, inserted in the progressive data block, is acquired in the processing of acquiring the progressive subtitle bitmap data.

(13) A reception method including the steps of:

receiving, by a reception unit, a container including a video stream having progressive video data and a subtitle stream having progressive subtitle bitmap data, in a predetermined format; and controlling, by a control unit, processing of acquiring the progressive video data with decoding of the video stream, processing of acquiring the progressive subtitle bitmap data with decoding of the subtitle stream, and processing of acquiring display video data with superimposition of the progressive subtitle bitmap data onto the progressive video data.

(14) A transmission device including:

a video encoding unit configured to generate a video stream having video data with first resolution;

a subtitle encoding unit configured to generate a subtitle stream having subtitle bitmap data with second resolution lower than the first resolution;

a transmission unit configured to transmit a container including the video stream and the subtitle stream, in a predetermined format; and an identification-information insertion unit configured to insert, into a layer of the subtitle stream, identification information indicating that, after performance of coordinate transform and resolution transform to the subtitle bitmap data, the subtitle bitmap data is to be superimposed onto the video data.

(15) The transmission device described in (14) above, further including a resolution-information insertion unit configured to insert, into a layer of the container, information regarding the first resolution included in the video data onto which the subtitle bitmap data to be superimposed.

(16) The transmission device described in (14) or (15) above, in which the first resolution is UHD resolution, and the second resolution is HD resolution.

(17) The transmission device described in any of (14) to (16) above, in which the identification-information insertion unit inserts the identification information into a display definition segment.

(18) The transmission device described in any of (14) to (16) above, in which the identification-information insertion unit inserts a segment as the identification information, into the subtitle stream.

(19) The transmission device described in (18) above, in which the segment as the identification information includes information regarding transform magnification.

(20) A transmission method including the steps of:

generating a video stream having video data with first resolution, by a video encoding unit;

generating a subtitle stream having subtitle bitmap data with second resolution lower than the first resolution, by a subtitle encoding unit;

transmitting a container including the video stream and the subtitle stream, in a predetermined format, by a transmission unit; and inserting, into a layer of the subtitle stream, identification information indicating that, after performance of coordinate transform and resolution transform to the subtitle bitmap data, the subtitle bitmap data is to be superimposed onto the video data, by an identification-information insertion unit.

(21) A reception device including:

a reception unit configured to receive a container including a video stream having video data with first resolution and a subtitle stream having subtitle bitmap data with second resolution lower than the first resolution, in a predetermined format, identification information being inserted in a layer of the subtitle stream, the identification information indicating that, after performance of coordinate transform and resolution transform to the subtitle bitmap data, the subtitle bitmap data is to be superimposed onto the video data; and a control unit configured to control processing of acquiring the video data with decoding of the video stream, processing of acquiring the subtitle bitmap data with decoding of the subtitle stream, and processing of acquiring display video data with the superimposition of the subtitle bitmap data onto the video data after the performance of the coordinate transform and the resolution transform to the subtitle bitmap data, on the basis of the identification information.

(22) A reception method including the steps of:

receiving, by a reception unit, a container including a video stream having video data with first resolution and a subtitle stream having subtitle bitmap data with second resolution lower than the first resolution, in a predetermined format, identification information being inserted in a layer of the subtitle stream, the identification information indicating that, after performance of coordinate transform and resolution transform to the subtitle bitmap data, the subtitle bitmap data is to be superimposed onto the video data; and controlling, by a control unit, processing of acquiring the video data with decoding of the video stream, processing of acquiring the subtitle bitmap data with decoding of the subtitle stream, and processing of acquiring display video data with the superimposition of the subtitle bitmap data onto the video data after the performance of the coordinate transform and the resolution transform to the subtitle bitmap data, on the basis of the identification information.

Figure 2:
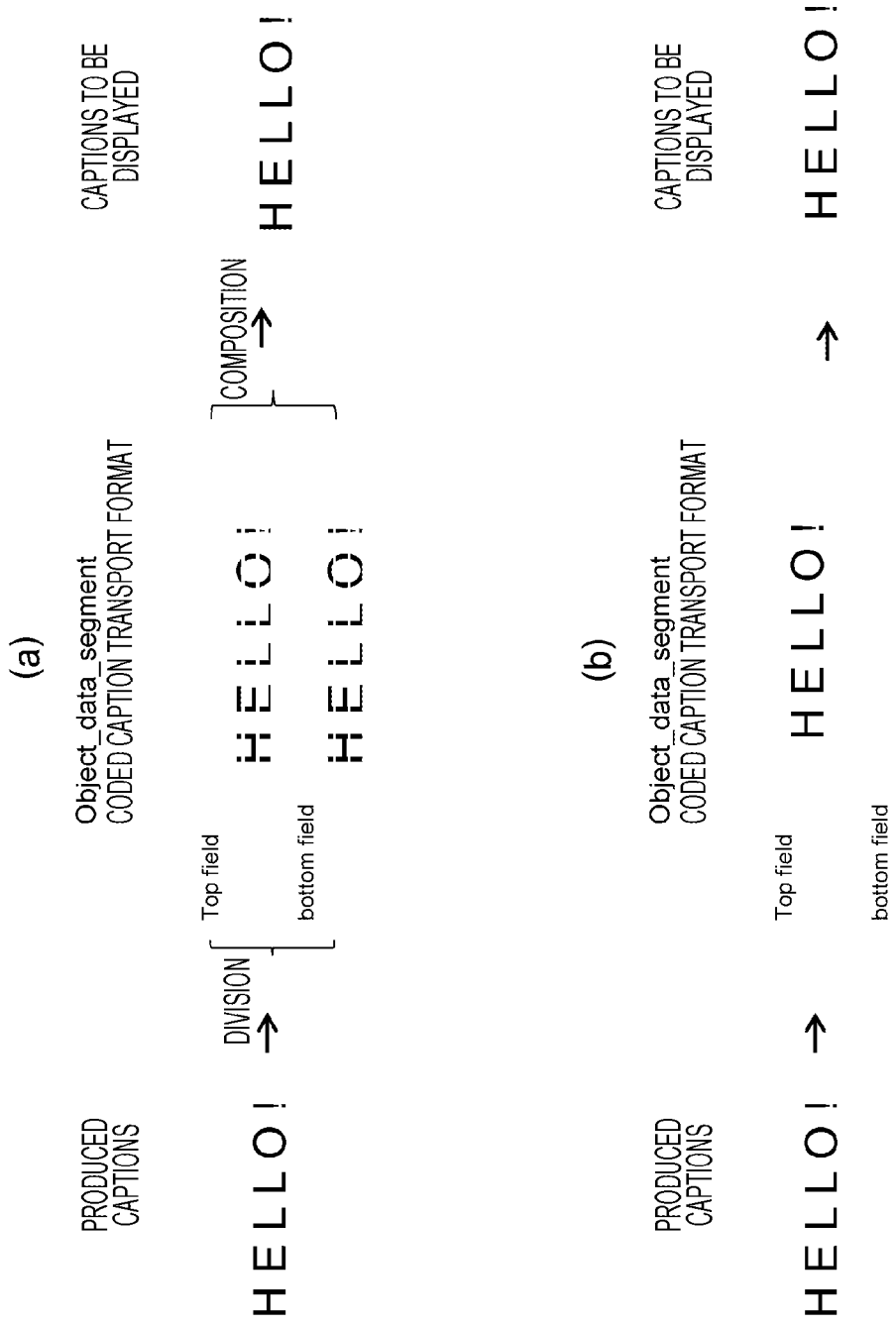
FIG. 2 is an explanatory representation for methods 1 and 2 for transporting progressive subtitle bitmap data.
Figure 3:
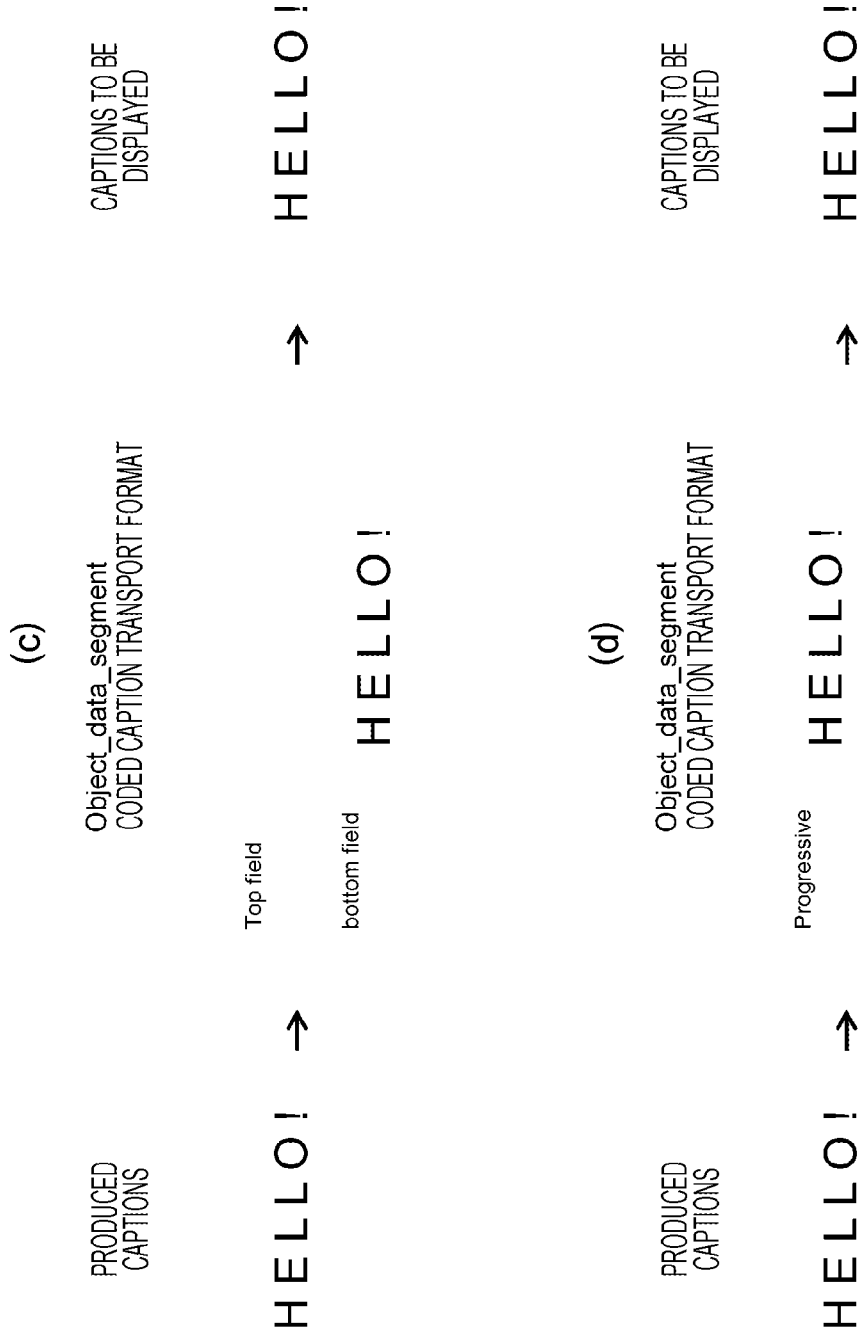
FIG. 3 is an explanatory representation for methods 3 and 4 for transporting the progressive subtitle bitmap data.

According to a main feature of the present technology, the transmission of the progressive subtitle bitmap data by the various transport methods along with the transmission of the progressive video data, allows the subtitle bitmap data to be favorably superimposed onto the video data on the reception side (refer to FIGS. 2 and 3).

In addition, according to another feature of the present technology, the insertion of the identification information indicating that, after the performance of the coordinate transform and the resolution transform to the subtitle bitmap data with the HD resolution, the subtitle bitmap data is to be superimposed onto the video data with the UHD resolution, into the layer of the subtitle stream, allows the subtitle bitmap data to be superimposed at an appropriate position on the video data with the UHD resolution on the reception side with the superimposition of the subtitle bitmap data onto the video data after the performance of the coordinate transform and the resolution transform to the subtitle bitmap data, on the basis of the identification information (refer to FIG. 4).

REFERENCE SINGS LIST

10 Transmission and reception system
100 Transmission device
101 Control unit
102 Camera
103 Video optic-electric conversion unit
104 RGB/YCbCr conversion unit
105 Video encoder
106 Subtitle generation unit
107 Bitmap data generation unit
108 Subtitle encoder
109 System encoder
110 Transmission unit
200 Reception device
201 Control unit
202 Reception unit
203 System decoder
204 Video decoder
205 Subtitle decoder
206 Coordinate and resolution transform unit
208 Video superimposition unit
209 YCbCr/RGB conversion unit
210 Electric-optic conversion unit
211 Display mapping unit
212 CE monitor
213 User operation unit

The invention claimed is:

1. A transmission device, comprising:
   processing circuitry configured to:
   generate a video stream having progressive video data;
   generate a subtitle stream having progressive subtitle bitmap data;
   insert information into the subtitle stream, the information indicating whether (i) a progressive data block is present or (ii) a top-field data block and a bottom-field data block are present;
   arrange, without division of the progressive subtitle bitmap data, the progressive subtitle bitmap data in the progressive data block included in a data segment in the subtitle stream when the information indicates the progressive data block is present, the data segment indicating a type of the progressive subtitle bitmap data, the progressive subtitle bitmap data being arranged based on the type of the progressive subtitle bitmap data; and
   transmit a container including the video stream and the subtitle stream, wherein the progressive subtitle bitmap data is coded progressively,
   wherein the progressive subtitle bitmap data is divided into top-field subtitle bitmap data and bottom-field subtitle bitmap data when the information indicates that the top-field data block and the bottom-field data block are present.

2. The transmission device according to claim 1, wherein the top-field subtitle bitmap data is arranged in the top-field data block and the bottom-field subtitle bitmap data is arranged in the bottom-field data block when the information indicates that the top-field data block and the bottom-field data block are present.

3. The transmission device according to claim 1, wherein the progressive subtitle bitmap data is arranged in the top-field data block or the bottom-field data block when the information indicates the top-field data block and the bottom-field data block are present.

4. The transmission device according to claim 1, wherein the processing circuitry is further configured to
   insert, into a layer of the subtitle stream, identification information indicating that, after performing coordinate transform and resolution transform on the progressive subtitle bitmap data having a first resolution, the progressive subtitle bitmap data is to be superimposed onto the progressive video data having a second resolution higher than the first resolution.

5. A transmission method, comprising:
   generating a video stream having progressive video data;
   generating a subtitle stream having progressive subtitle bitmap data;
   inserting information into the subtitle stream, the information indicating whether (i) a progressive data block is present or (ii) a top-field data block and a bottom-field data block are present;
   arranging, without dividing the progressive subtitle bitmap data, the progressive subtitle bitmap data in the progressive data block included in a data segment in the subtitle stream when the information indicates the progressive data block is present, the data segment indicating a type of the progressive subtitle bitmap data, the progressive subtitle bitmap data being arranged based on the type of the progressive subtitle bitmap data; and
   transmitting a container including the video stream and the subtitle stream, wherein the progressive subtitle bitmap data is coded progressively,
   wherein the progressive subtitle bitmap data is divided into top-field subtitle bitmap data and bottom-field subtitle bitmap data when the information indicates that the top-field data block and the bottom-field data block are present.

6. A reception device, comprising:
   processing circuitry configured to:
   receive a container including a video stream, the video stream including progressive video data and a subtitle stream that includes progressive subtitle bitmap data, the progressive subtitle bitmap data being coded progressively, information indicating whether (i) a progressive data block is present or (ii) a top-field data block and a bottom-field data block are present is inserted into the subtitle stream,
   decode the video stream to acquire the progressive video data,
   decode the subtitle stream to acquire the progressive subtitle bitmap data, and acquire display video data associated with superimposition of the progressive subtitle bitmap data onto the progressive video data, wherein the progressive subtitle bitmap data is not divided and is arranged in a progressive data block included in a data segment in the subtitle stream when the information indicates the progressive data block is present, the data segment indicating a type of the progressive subtitle bitmap data, the progressive subtitle bitmap data being arranged based on the type of the progressive subtitle bitmap data, and the progressive subtitle bitmap data is divided into top-field subtitle bitmap data and bottom-field subtitle bitmap data when the information indicates that the top-field data block and the bottom-field data block are present.

7. The reception device according to claim 6, wherein
the progressive subtitle bitmap data is acquired with composition of the top-field subtitle bitmap data and the bottom-field subtitle bitmap data.

8. The reception device according to claim 7, wherein
the acquired progressive subtitle bitmap data is not divided, and is inserted in the top-field data block or the bottom-field data block when the information indicates the top-field data block and the bottom-field data block are present.

9. A reception method, comprising:
receiving a container including a video stream, the video stream including progressive video data and a subtitle stream that includes progressive subtitle bitmap data, the progressive subtitle bitmap data being coded progressively, information indicating whether (i) a progressive data block is present or (ii) a top-field data block and a bottom-field data block are present is inserted into the subtitle stream;

decoding the video stream to acquire the progressive video data;

decoding the subtitle stream to acquire the progressive subtitle bitmap data; and acquiring display video data associated with superimposition of the progressive subtitle bitmap data onto the progressive video data, wherein the progressive subtitle bitmap data is not divided and is arranged in a progressive data block included in a data segment in the subtitle stream when the information indicates the progressive data block is present, the data segment indicating a type of the progressive subtitle bitmap data, the progressive subtitle bitmap data being arranged based on the type of the progressive subtitle bitmap data, and wherein the progressive subtitle bitmap data is divided into top-field subtitle bitmap data and bottom-field subtitle bitmap data when the information indicates that the top-field data block and the bottom-field data block are present.

10. The transmission device of claim 1, wherein
the data segment is an object data segment.

11. The transmission device of claim 1, wherein
the data segment is in a coded caption transport format.

12. The reception device of claim 6, wherein
the data segment is an object data segment.

13. The reception device of claim 6, wherein the data segment is in a coded caption transport format.

\* \* \* \* \*